Feb. 12, 1952  G. B. WARREN  2,585,198
CONTAINER WITH MEASURING AND DISPENSING MEANS
Filed April 8, 1948
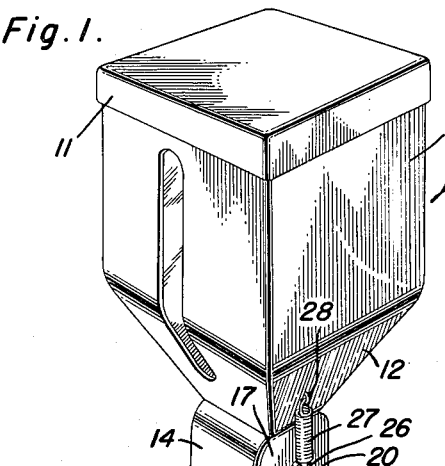
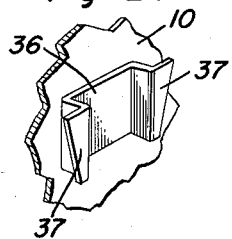
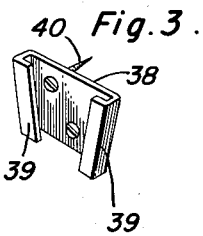
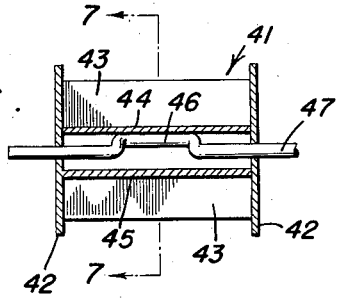
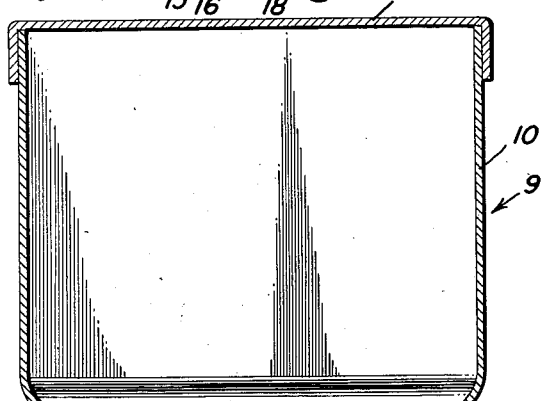
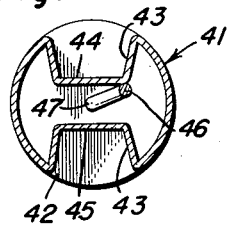
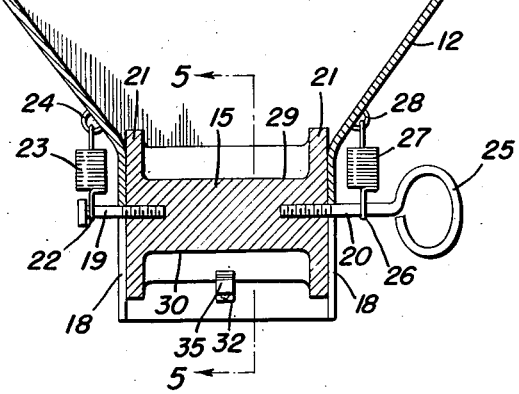
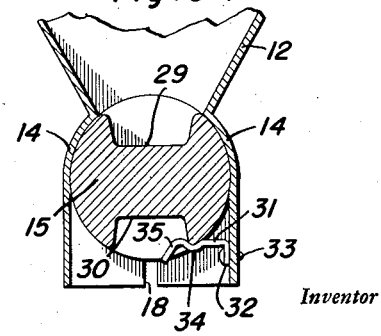
Inventor
George B. Warren
By *Clarence A. O'Brien and Harvey B. Jacobson*
Attorneys Patented Feb. 12, 1952

2,585,198

UNITED STATES PATENT OFFICE 2,585,198

CONTAINER WITH MEASURING AND DISPENSING MEANS

George B. Warren, Los Angeles, Calif.

Application April 8, 1948, Serial No. 19,807

2 Claims. (Cl. 222—368)

The present invention relates to a container for dry granular commodities such as sugar, ground coffee and the like, and has more particular reference to a structure which is characterized by novel and improved hand actuated measuring and dispensing means, the latter being especially made to discharge a limited quantity, for example a tablespoonful of the container contents at each operation.

As the generalized introductory statement of the invention implies, I am aware that dispensing containers having measuring valves and so-called measuring drums are not new. In fact, it is a matter of common knowledge that a number of varied types and forms of quantity measuring and dispensing receptacles and containers are well known. My primary aim is, therefore, to provide a measuring type dispenser or container having certain features of refinement and improvement which, collectively considered, aptly fulfill the requirements of manufacturers and users and, thus, attain the wanted ends with requisite efficiency and dependability.

More specifically, one distinguishing point of novelty has to do with a hood-like discharge neck, the latter enclosing a rotary valve and said valve being provided with measuring and dispensing pockets and being especially constructed and mounted for ready insertion and removal.

Additional novelty is predicated upon the stated valve containing neck, said neck properly encasing the valve, the valve being spring-suspended within the confines of the neck and a spring detent being provided to facilitate rotatable operation of the valve in assured step-by-step progression.

Other objects and advantages will become more readily apparent from the following description, claims and drawings.

In the accompanying sheet of drawings:

Figure 1 is a perspective view of a measuring and dispensing type container constructed in accordance with the principles of the present invention;

Figure 2 is a fragmentary perspective view of a wall bracket by which the container may be hung;

Figure 3 is also a perspective view of a bracket which is adapted to be attached to a wall;

Figure 4 is an enlarged sectional end elevational view showing the essential details of construction and their relative association and arrangement;

Figure 5 is a cross section on the line 5—5 of Figure 4, looking in the direction of the arrows;

Figure 6 is a longitudinal sectional view through a modified measuring valve or drum; and, Figure 7 is a section on the line 7—7 of Figure 6.

Referring now to the drawings by distinguishing reference numerals, the container, as a unitary enclosure, is denoted by the numeral 9 and is of appropriate material, shape and capacity. The body portion is preferably a rectangular hopper 10 whose open top is closed by a suitable flanged cover 11 and whose bottom is fashioned into a downwardly tapering funnel portion 12 terminating in a hood-like valve casing 13.

As shown in Figure 1, the funnel 12 merges into the neck, and the coacting portion of the neck is arcuately curved as at the point 14 to snugly receive and conform to the cylindrical exterior surfaces of a rotary measuring and dispensing valve 15. The lower skirt portions of the main side walls of the neck are straight and parallel as denoted at 16 and the complemental end walls are flat and substantially rectangular in outline as at 17. The end walls 17 have elongated keeper and assembling notches 18 which open through the bottom or lower edge portions and which serve to accommodate shank portions of screws 19 and 20 which are threaded into disclike heads 21 at opposite ends of the head. The screw 19 has its outer end headed to accommodate a hook 22 on the lower end of a coiled suspension spring 23, the latter being anchored on the eye 24. The screw 20 on the opposite side has a finger-grip 25 and the shank portion of said screw serves to accommodate a hook 26 on the lower end of a hanger spring 27, the latter having its upper end connected with a hanger eye 28 on the funneling portion 12. It will be seen that in diametrically opposite sides the valve is provided with recesses or cavities 29 and 30 defining measuring pockets. These are adapted to register one with the funnel and the other with the discharge or open bottom of the neck, as shown in Figures 4 and 5. And, also, as seen in Figure 5, I provide a detent clip 31 having a depending end 32 riveted in place as at 33 and provided with a retaining bend 34 which engages an edge portion of the pocket in a manner to permit the valve to be rotated against the cam-like trip 35. With the valve thus constructed and coacting with 34 and 35, the desired latching and tripping results may be attained.

In Figure 2 I have illustrated an attaching or adaptor bracket 36 which is fastened to the container 10 and which has laterally directed keeper members 37 which are properly angled and tapered and are designed to fit into a wall-type angle bracket 38 having keeper channels 39 and adapted to be secured in place by screws or the like 40.

In Figures 6 and 7 I have illustrated a modified measuring drum or valve which is denoted and distinguished by the numeral 41. This is a hollow metal cylinder having disc-like heads 42 and having indentations 43 and 44 forming the desired measuring pockets. The basal portions 44 and 45 of the pockets provide cam-like wiping surfaces to accommodate the camming crank 46 on the rotatably mounted crank shaft 47. The idea here is to simply provide an alternative means for turning the valve by a simple crank action. The detent means will be the same, in this form of the invention, as is shown in Figure 5.

In practice the container is charged with the ground coffee or the like by removing the closing lid 11. The valve is then in a position wherein the coffee, which gravitates down the funnel 12 is collected in the measuring pocket which is then in open alignment with said funnel. Then, the finger-gripping means 25 is grasped and the valve is turned in an obvious fashion to dump the pocketed charge of coffee into a cup or the like (not shown). As soon as the pocket turns to a "down" or dumping position as shown in Figure 5, the detent comes into play and holds the valve steady.

By "hanging" the valve on the funnel-like adaptor neck, a good fit between parts is virtually assured. Also, the springs can be readily unhooked and the valve means easily removed from the slotted end walls.

It will be seen that I have evolved and produced a simple, practical, economical and up-to-date dispensing-type container having an efficient measuring valve arrangement and manual control means for same. I am not unmindful that dispensing containers and measuring valves therefor are not new. I believe, however, that my particular valve means, operating devices and suspending springs therefor and the canopy-like neck which houses the valve and forms the discharge neck for the hopper are new and improved adaptations in this field of endeavor.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a dispenser of the class described, a one piece open-top container, the lower portion of said container being fashioned into a downwardly tapering funnel-like portion and embodying at its discharge end an inverted open bottom valve casing including parallel side walls and end walls and each end wall having a slot opening downwardly through the lower edge portion of said end wall, a substantially cylindrical valve inserted and fitted upwardly through said open bottom and lodged for rotation in said casing, journals on the end portions of said valve operable slidably and rotatably in the respective slots in said end walls, one of said journals being provided with a finger grip, coiled springs attached to and suspended from said container and having their lower end portions attached to said journals, said valve having diametrically opposite measuring and dispensing pockets, and a spring clip within the confines of and fastened to said valve casing and having a detent underlying said valve to releasably engage and coact with surface portions of said valve.

2. In a dispenser of the class described, a one piece open-top container, the lower portion of said container being fashioned into a downwardly tapering funnel like portion and embodying at its discharge end an inverted open bottom valve casing including parallel side walls and end walls, each end wall having a slot opening downwardly through the lower edge portion of said end wall, a substantially cylindrical valve inserted and fitted upwardly through said open bottom and lodged for rotation in said casing, journals on the end portions of said valve operable slidably and rotatably in the respective slots in said end walls, one of said journals being provided with a finger grip, said valve having diametrically opposite measuring and dispensing pockets, and resilient means operatively engaging the container and the valve so as to urge said journals against the upper limits of said slots.

GEORGE B. WARREN.

REFERENCES CITED

The following references are of record in the file of this patent:

UNITED STATES PATENTS

| Number | Name | Date |
|---|---|---|
| 852,603 | Hanlon | May 7, 1907 |
| 1,199,502 | Schyler et al. | Sept. 26, 1916 |
| 1,969,110 | Teach | Aug. 7, 1934 |
| 2,054,743 | Fend | Sept. 15, 1936 |
| 2,141,815 | Kelly | Dec. 27, 1938 |